United States Patent [19]
Park et al.

[11] Patent Number: 5,880,243
[45] Date of Patent: Mar. 9, 1999

[54] FIRE RETARDANT COMPOSITE PRODUCTS OF CELLULOSE IMPREGNATED WITH ISOCYANATE COMPOSITIONS

[75] Inventors: David W. Park, Puyallup; Bruce A. Thompson, Federal Way, both of Wash.

[73] Assignee: Weyerhaeuser Company, Tacoma, Wash.

[21] Appl. No.: 845,000

[22] Filed: Apr. 23, 1997

[51] Int. Cl.$^6$ ............................... C08G 18/00; C08H 5/04
[52] U.S. Cl. ........................... 527/103; 527/301; 528/58; 528/59; 528/72; 528/398
[58] Field of Search .................................... 527/103, 301; 528/58, 59, 72, 398

[56] References Cited

U.S. PATENT DOCUMENTS

| | | | |
|---|---|---|---|
| 5,008,359 | 4/1991 | Hunter | 527/103 |
| 5,140,086 | 8/1992 | Hunter et al. | 527/103 |
| 5,220,760 | 6/1993 | Dimakis | 52/309.9 |
| 5,280,097 | 1/1994 | Hunter et al. | 527/103 |
| 5,292,391 | 3/1994 | Wallick | 156/205 |
| 5,332,458 | 7/1994 | Wallick | 156/210 |
| 5,345,738 | 9/1994 | Dimakis | 52/309.9 |
| 5,391,583 | 2/1995 | Blount | 521/85 |
| 5,580,922 | 12/1996 | Park et al. | 524/733 |

*Primary Examiner*—Nathan M. Nutter

[57] ABSTRACT

New and useful products are based on sheeted cellulose impregnated with a polyfunctional isocyanate and a fire retardant material. The fire retardants are chosen from organophosphorous esters compatible with the isocyanate in the proportions used. Preferred impregnating compositions use about one part of isocyanate and two parts of a halogenated diphosphate ester. Other compatible phosphorous based materials may be included for viscosity control.

20 Claims, No Drawings

FIRE RETARDANT COMPOSITE PRODUCTS OF CELLULOSE IMPREGNATED WITH ISOCYANATE COMPOSITIONS

The present invention is directed to new and useful products comprising cellulose which has been impregnated with a polyfunctional isocyanate and a particular class of phosphorous-based materials to achieve a high level of fire retardancy without loss of physical properties.

BACKGROUND OF THE INVENTION

Various paper and similar products have been impregnated with polyisocyanates for uses which include decorative paneling and structural skins of products such as foam or honeycomb filled sandwich panels. Many other applications, such as air filters and floor and roof underlayments, have also become important. Hunter, in U.S. Pat. No. 5,008,359, describes one method of making such products. A sheeted cellulosic paper, such as kraf linerboard, is at least partially impregnated with an essentially uncatalyzed polyfunctional isocyanate. Normally several sheets so impregnated would be superposed and subsequently cured in a press under heat and considerable pressure to form thin panels. Use of any customary catalysts was avoided since they appeared to cause poor adhesion between various plies of the laminates. Preferred pressing temperatures are in excess of 150° C. with pressures of 3000 kPa or greater. A poly(diphenylmethane diisocyanate) (PMDI) appeared to be preferred as the impregnant.

Hunter et al., in U.S. Pat. No. 5,140,086 describe an apparent improvement on the above process. In order to achieve better and more uniform impregnation of the cellulosic substrate the isocyanate is applied in admixture with a miscible organic solvent. Propylene carbonate is the preferred solvent. This was chosen because of its low toxicity, viscosity and vapor pressure at room temperature, its high boiling point of 242° C., and because it is substantially odorless and colorless. A high boiling point material was desirable to prevent blistering during the heat curing operation. In addition to improving impregnation uniformity, propylene carbonate used in a range of 5–20%, gave improved physical properties. It was speculated that the propylene carbonate also may serve as a copolymerizable reactant to some extent. Curing of the product was done under conditions of heat and pressure similar to those described above. It was permissible to include up to 0.5% of a catalyst with the isocyanate-solvent mixture to accelerate the curing reaction.

A later patent to the same inventors, U.S. Pat. No. 5,280,097, is directed to making laminated panel materials in which the earlier products and methods are used as substrates for decorative overlays. The overlay, such as a melamine resin treated printed paper, could be applied to the isocyanate treated substrate or to a laminate formed from a number of substrate plies. These were then preferably cured simultaneously in a single pressing step.

Dimakis, in U.S. Pat. Nos. 5,220,760 and 5,345,738, describes foam filled structural panels made using skins of kraft paper impregnated as taught in one of the above patents.

All of the above noted methods and products require the use of extremely expensive presses for curing the product. However, it has been known that polyisocyanates impregnated into cellulosic substrates will cure to insoluble polymers over prolonged periods of time at ambient conditions. This is believed to be due to slow reaction with the natural moisture present in the substrate, with atmospheric moisture, and possibly by reaction with hydroxyl groups of the cellulosic substrate. PMDI is generally the isocyanate of choice. Wallick, in U.S. Pat. Nos. 5,292,391 and 5,332,458 teaches application of a material such as PMDI to corrugated medium for strength enhancement of corrugated container board without adversely affecting repulpability of the product. The preferred procedure is to apply the isocyanate by spraying after corrugation but prior to application of adhesive at the single facer of the corrugator. Heat curing is thereafter minimized to enhance repulpability. Curing of the isocyanate impregnant continued well after application of the second liner to the product.

PMDI products are composed of a wide range of oligomriers and varying amounts, typically 40–60% of monomeric 4,4'-diphenylmethane diisocyanate (MDI). NCO—functionality of the products sold as PMDI can vary widely, e.g., from about 1.4 to 3.2, with viscosities ranging from about 50 to 1800 cps. As the curing reaction with water occurs under ambient conditions an intermediate reaction product is 4,4'-diaminodiphenylmethane (MDA). This, in turn, again reacts with available —NCO groups to ultimately form insoluble polyureas. MDA is a relatively toxic chemical and it is desirable that its content, as well as the content of residual unreacted MDI, should be as low as possible. Thus it is highly desirable that cure rates should be relatively rapid and that the curing reaction of the PMDI should approach completion with a minimum of unreacted products. If suitably rapid cure rates could be achieved under ambient conditions numerous applications of the polymer impregnated product would present themselves. In the case of flat panels, elimination of the hot pressing step would considerably reduce the cost. Park et al. in U.S. Pat. No. 5,580,922 describe a cellulose product impregnated with a polyisocyanate along with a smaller amount of triacetin or triethyl citrate. The additives speed curing of the isocyanate to polyureas under room temperature conditions and reduce the presence of undesirable reaction intermediate products.

While PMDI is used to a large extent for preparation of urethane foams and other products by reaction with various polyols or polyethers, it is also used by itself as an adhesive for medium density composite wood products and oriented strand boards. However, in all of these uses the product is hot pressed to effect the reaction to polyureas in a minimum time.

Certain applications of products such as those described above in the Hunter et al. or Park et al. patents would find broader application if they had enhanced resistance to burning. Urethane foams have long employed organophosphorous based or heavily halogenated chemicals for inducing fire resistance. For best results, these are frequently used in combination with an inorganic additive, typically antimony oxide. However, the chemistry of urethanes is quite different from that of the present system and it is unclear whether those fire retardants conventionally used with urethianes would be acceptable at all. Extensive experimental work has indeed shown this to be the case. Problems of coreactivity and lack of compatibility with PMDI have greatly complicated the problem. The present inventors have no knowledge of fire retardant materials being successfully used with neat polyisocyanates where they are not to be further reacted with other materials such as polyols.

The present invention presents a solution to the problem of making fire retardant PMDI impregnated cellulose products in its finding that a very limited group of additives are highly effective in conveying fire resistance.

SUMMARY OF THE INVENTION

The present invention is directed to new and useful cellulosic fiber-polymer composite products having enhanced resistance to burning. Certain products of the invention will approach or meet ASTM E 84 Class B fire ratings or higher. The invention comprises impregnation of sheeted cellulose products with a polyisocyanate admixed with a fire retardant material compatible with the isocyanate. By compatible is meant that the fire retardant is completely soluble or miscible with the isocyanate in the proportions used and that it is essentially unreactive with the isocyanate. The sheeted cellulose is impregnated with 10–80 parts per 100 parts of cellulose with a treating solution comprising a mixture of a polyisocyanate at least difunctional in —NCO groups with the compatible fire retardant material in a ratio of 4:1 to 1:5. Depending on the particular fire retardant material used, a preferred range of isocyanate to retardant is about 1:1 to 1:3, most preferably about 1:2. Regardless of the ratio of polyisocyanate to fire retardant material, sufficient treating solution must be used to supply at least 5 parts of the isocyanate per 100 parts of cellulose fibers. Where the term "parts" is used it universally refers to parts by weight.

The preferred fire retardant chemicals are organophosphorous esters. Diphosphate esters are preferred since phosphorous content is usually somewhat higher than the monophosphate esters. Mixtures of these materials are also advantageous. Phosphorous content of the fire retardant additive or additives should exceed at least about 7% by weight and preferably should be at least about 8–12% by weight. Most preferably the fire retardant material is halogenated or, in the case of mixtures, at least the predominant material is halogenated. A halogenation level of at least about 30% chlorine or bromine by weight of the fire retardant additive is most preferred. Chlorine is the most common halogen substituent. The amount of phosphorous in the ultimate product is normally in the range of about 0.5 to 2.5%, preferably about 1.4 to 2.2%. Similarly the halogen level in the ultimate product will range from about 0% to 8%, preferably about 4% to 7% when the halogen is chlorine. The phosphorous and halogen levels will depend significantly on the degree of fire resistance required for the particular end use of the product.

The term polyisocyanate or polyfunctional isocyanate is defined as those isocyanate compositions that are at least bifunctional in available —NCO groups. In addition to the preferred poly(diphenylmethane diisocyanate) other lower aliphatic, alicyclic or aromatic polyisocyanates, such as tolylene diisocyanate are also believed to be suitable.

The cellulosic portion of the product is preferably in sheeted form. It may be chosen from cellulose produced by any of the usual pulping processes including chemically pulped wood fibers; e.g., by the kraft or sulfite processes, ithermomechanical wood pulps, mechanically defibered wood pulps, and mixtures of these. The cellulosic portion may also be made from non-wood sources such as cotton rags or cotton linters. While it is preferred that the cellulosic material be at least partially delignified, this is not absolutely essential. Kraft pulps, either bleached or unbleached, are a preferred material for impregnation.

It is an object of the invention to provide new and useful cellulose composite products having improved fire resistance properties.

It is an another object of the invention to provide cellulose composite products that approach or meet ASTM E 84 Class B standards.

It is an additional object to provide cellulose composite products having enhanced fire resistance without loss of strength and rigidity.

It is a further object to provide fire resistant cellulose composite products that can be formed into many configurations.

These and many other objects will become readily apparent to those skilled in the art upon reading the following detailed description.

DETAILED DESCRIPTION OF THE PREFERRED EMBODIMENTS

There is no single standard test for fire resistance of various construction materials. Various industries have developed their own tests and these are largely dependent on the nature of the product being tested and its expected use. One widely used test is the 25 foot tunnel test in which flame spread is carefully monitored on a large sample under standardized conditions. This is outlined as ASTM test method E-84 which uses a 2×25 foot test specimen. However, this test is complex and expensive and very few facilities are equipped to perform it. Nor is it applicable to all materials. Although not a standardized test method and one which may vary somewhat from user to user, a 2 foot tunnel test has been developed that is closely predictive of performance in the 25 foot tunnel. A test of this type is described in a paper by Vandersoll, H. L., The use of a small flame tunnel for evaluating fire hazard, *Journal of Paint Technology*, 39: 494–500 (1967). Briefly described, a metal framework is constructed to hold a sample 3½–4 inches wide and 24 inches long at an angle of about 23°–28°. The center 2 inches of the sample is unsupported. An asbestos cement board is placed above and in contact with the test sample. Thermocouples may be attached to this backing to record temperatures during the test. The framework is enclosed within asbestos cement side sheets having view ports at 1 inch intervals to enable observation of the flame front during the test. A Fisher burner is used as the flame source below the low end of the sample. This is fueled with natural gas at a specified pressure and flow rate. Observations of the flame front are recorded every 15 seconds for 4 minutes. The burner is extinguished at this time but observations are continued to record any afterburning or the presence of glowing embers. The distance that the flame front has progressed up the sample is the main parameter evaluated. Any sample in which the flame front has reached or closely approached the end of the sample is considered to have failed. Loss in weight after burning may also be recorded. The two foot tunnel is frequently used to predict burning properties of wood and composite wood products.

A test used predominantly for determining fire resistance of textiles has been developed by the National Fire Prevention Association as method NFPA 701. It is noted in the method that the test "differentiates fabrics that do not flame extensively from those that do burn rapidly and extensively". No numerical ratings are given to tested samples. Instead the test criteria are set so that a sample has a pass/fail rating. Two variations of the test are used for different materials. Test 1 uses a sample size of 150×400 mm while Test 2 uses a 125×1200 mm sample. Conditioned samples are suspended vertically and subject to a calibrated ignition source at the bottom. In the large scale test the test flame is applied to the sample for two minutes and then withdrawn. Duration of burning after the igniting flame is removed is recorded as is the burning duration of any material that drops to the floor of the test chamber. Criteria for Test 1 is that average weight loss of 10 replications may not exceed 40%. For Test 2, the flame was applied for 12 seconds. Any specimen that burns for more than 2 seconds after flame removal is considered to fail the test. Similarly, a specimen exceeding a maximum allowable char length is considered to fail the test. For both tests, any fragments falling to the floor that burn for more than 2 seconds are considered to fail.

The bum test defined in 49 C.F.R Ch. V § 571.302 (DOT 302) specifies burn resistance requirements for materials used in the occupant compartments of motor vehicles. A sample 4×4×14 inches, with a maximum thickness of 0.5 inch, is held horizontally in U-shaped channels. A small Bunsen burner with the air vents closed is adjusted a flame height of 1½ inches. The burner is placed so that the tip is ¾ inch below the bottom edge at one end of the specimen. The specimen is exposed to the flame for 15 seconds. Flame advance is timed until it either stops or reaches a point 1½ inches from the opposite end of the specimen. The burn rate may not be more than 4 inches per minute. Timing is begun when the flame from the burning specimen has reached 1½ inches from the ignited end. If the specimen stops burning before it has burned for 60 seconds from the start of timing and has not burned more than 2 inches from the point where timing was begun the specimen is considred to pass the test.

A very simple laboratory screening test is quite informative in predicting performance in one of the more formalized tests. A strip of material about 25 mm wide and 20–30 cm in length is held vertically by tongs over a Fisher burner until it ignites. It is then removed from the flame to see if burning persists. If the sample self extinguishes within a few seconds it is considered to have enhanced fire resistance.

Surprisingly, many of the materials usually regarded as fire retardant additives for wood products, fabrics, or urethane foams have been ineffective or only marginally so in the attempt to tailor fire retardancy into the cellulose-isocyanate composite products. Some are reactive with the polyisocyanate while others interfere with curing and processing or produce undesirable chemical side reactions. Many have caused unacceptable degradation of physical properties of the ultimate product. In particular some have caused a "softness" resulting in lack of edgewise compression strength. This may possibly be due to their modifying the chemistry of the present system in which the uncatalyzed isocyanate, used without the presence of other reactive components such as polyols, is impregnated into the cellulosic substrate and allowed to cure to polyureas at room temperature.

A preferred class of fire retardant materials are organophosphorous esters high in phosphorous content. Diphosphate esters, i.e., those having two phosphorous atoms in the molecule, are preferred compounds. Monophosphate esters having sufficiently high phosphorous content are also generally suitable. Most preferably these compounds are also highly chlorinated or brominated. As was defined earlier, these must be compatible but essentially unreactive with the polyisocyanate. Cloroalkyl phosphate or diphosphate esters are preferred fire retardant materials. Unhalogenated alkaryl phosphate esters are also suitable but are most preferably used as a minor component in conjunction with a halogenated product. A suitable diphosphate ester is of the general formulation:

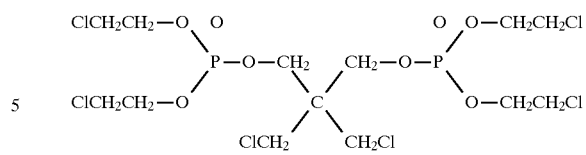

where any of $R_1$ to $R_6$ are $C_1$ to $C_4$ alkyl groups or aryl moieties and X is H, Cl or Br. Y may be H, $R_7X$ or $R_8X$ where $R_7$ and $R_8$ are lower alkyl or aryl groups. A particularly suitable material is of the formulation:

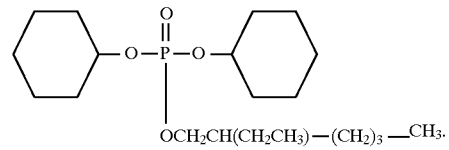

A material of this composition is available as Antiblaze® 100 from Albright and Wilson Inc., Richmond, Va. The material has 10.6% phosphorous and 36.5% chlorine by weight.

When products from specific suppliers are mentioned, this is not intended as an endorsement of their effectiveness since in many cases fully equivalent products are available from other vendors. Where proprietary products are mentioned in examples that failed to achieve the desired level of fire retardency this should in no way be considered a disparagement of the value of that product when used under other conditions or in other applications.

While the diphosphate compounds such as those above are preferred because of their generally higher phosphorous content, simple phosphate esters of the form:

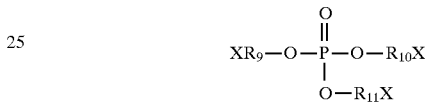

where $R_9$, $R_{10}$, and $R_{11}$ are $C_1$ to $C_{12}$ alkyl groups or aryl moieties and X is H, Cl, or Br as above, have also been found to be effective. It should be understood that the terms "phosphate" and "phosphate ester" are synonymous in the context of the present application.

An exemplary product of an unhalogenated phosphate ester is 2-ethylhexyldiphenyl phosphate having the formula:

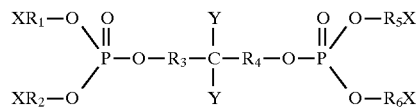

This is available as Santicizer® 141 Plasticizer from Monsanto Company, St. Louis, Mo. and has 8.6% phosphorous content. While products of this type are useful by themselves, the lower phosphorous content and lack of halogen substitution usually requires larger concentrations to be used in comparison with the halogenated phosphates and diphosphates. They are most useful as additives for viscosity control when combined with a major proportion of halogenated phosphate or diphosphate ester fire retardant materials.

Salts such as mono- and diammonium phosphate, and inorganic borates have a long history for use as fire retardants. While possibly having limited use in the present application, they are not preferred because of their limited solubility in the isocyanate, their susceptibility to leaching from the product, and their hygroscopicity. Similarly, brominated organic materials have been widely used for inducing fire retardance in products such as urethane foams where they are normally used in conjunction with antimony oxide. However those compatible brominated materials lacking a significant phosphorous content have given indifferent results in the present products.

The following experimental data will indicate the best mode presently known to the inventors of preparing the

EXAMPLE 1

A composite was made using 58 lb/1000 ft$^2$ basis weight unbleached kraft liner board impregnated with 19.3% by weight of liner of the following mixture: 60% PMDI, 30% pentabromodiphenyl oxide blend, and 10% propylene carbonate. The product contained 11.6% PMDI and 5.8% of the brominated material which was a proprietary composition available as DE-60F™ Special from Great Lakes Chemical Corporation, West Lafayette, Ind. and has 60% by weight bromine content. Bromine content of the ultimate product was about 3.5%. The PMDI was PAPI™ 901 available from Dow Chemical Co., Midland, Mich. This material has a functionality of 2.3 and a viscosity of 55 cps. After curing and conditioning, a two ply product was tested using the two foot tunnel method. Little or no improvement in burning resistance was seen in comparison with a control sample lacking the brominated composition.

EXAMPLE 2

A kraft linerboard similar to that of Example 1 was first impregnated using a submerged roll coater with a 25% aqueous solution of disodium tetrabromophthalate (74.5% Br by weight) to achieve an 8% dry weight add on. It was then impregnated with a 27% solution of DE-60F Special in PMDI (PAPI 901) to give a total 16% add on. Total bromine content of the product was approximately 7.3%. Three ply samples were tested in the two foot tunnel and found to burn slightly more aggressively than a control sample containing no fire retardant.

EXAMPLE 3

An aqueous solution of 10% monoammonium phosphate and 5% sodium octaborate was made up and vacuum impregnated to saturation into 58 lb kraft linerboard. The loading of salts after drying was 26.1% based on the liner weight. The dried impregnated sheets then treated with PMDI containing 10% propylene carbonate, obtaining a loading of PMDI of 7.0%. A subjective observation indicated that the panels were more brittle than the control samples lacking the fire retardant salts. Three ply panels were tested using the two foot tunnel. The product had a flame spread only marginally lower than untreated control samples.

EXAMPLE 4

In place of the kraft linerboard, a 168 lb/3000 ft$^2$ basis weight saturating kraft treated with 40% aluminum trihydrate was substituted. This is available from Mead Paper Company, Chillicothe, Ohio, as Firepli™ II 66575-01. A solution of 100 g PAPI 2027 (functionally 2.7, viscosity 180 cps) and 50 g Great Lakes Chemical DE-60F Special was made in 500 mL acetone to reduce viscosity. The saturating paper was dipped in the solution and air dried to remove the acetone. A total loading of 32.1% was achieved of which 21% was PMDI and 11% of the DE-60F Special. Total bromine content was 6.7%. Surprisingly, the treated sample burned more vigorously than the untreated control sample in the two foot tunnel. It was estimated that the control sample would have achieved a Class B rating by ASTM E 84 while the treated materials would have been rated Class C. It should be noted that both the cellulosic substrate and the polyurea in the cured product contribute to the available fuel on burning.

EXAMPLE 5

Samples of 69 lb kraft liner were cut to dimensions of 10×25 inches with the machine direction parallel to the long dimension. A treating solution was made up of 31.7 weight % PAPI 910, 63.3% Antiblaze 100 or Antiblaze 80 and 5% triacetin. The triacetin served both as a cure enhancer and viscosity reducer for the treating material. Antiblaze 80 is tris(2-chloropropyl) phosphate. The linerboard was coated on the wire side to loadings of 21.0 and 13.9 lb/Mft$^2$ using the Antiblaze 100 composition and 20.9 lb/Mft$^2$ with the Antiblaze 80 composition. Penetration through the sheet was noted with the Antiblaze 80 mixture, probably due to its lower viscosity. Preliminary laboratory tests in which the samples were ignited over a Fisher burner showed that all were self extinguishing. A similar sample lacking the organophosphorous esters continued to burn after ignition.

EXAMPLE 6

In the cellulose-polyurea composite products described to date, none would have achieved a rating by ASTM E 84 higher than Class C. In addition, physical properties of most of the samples were adversely affected. It is essential that the PMDI cure to a thermoset polymer that is not over plasticized. Otherwise physical properties, in particular edgewise compression, is seriously decreased. Surprisingly, it was discovered that very large quantities of chlorinated phosphate esters or diesters could be added to the product without over plasticizing and having adverse affect on the physical properties. As one example, Antiblaze 100, described earlier, could be added in amounts up to at least twice the polyisocyanate by weight without deleterious effect. A mixture of 66 parts Antiblaze 100 and 34 parts PAPI 901 was made. This was coated onto each face of 42 lb kraft linerboard to achieve a loading of 25 parts solution to 100 parts by weight liner. The resulting composite contained 1.7% phosphorous and 5.9% chlorine by weight. Treated material was air cured four days before conditioning and testing.

In a preliminary test 3 inch strips of the treated material were suspended vertically and ignited by a propane burner. The samples extinguished immediately when the burner was removed. A control sample lacking the fire retardant material continued to burn vigorously after removal of the flame. Samples were then tested in the two foot tunnel. A single layer product would have had a predicted ASTM E 84 rating of Class B. A three layer product was predicted to have a marginal Class B rating while a four layer product was predicted to have a Class C rating. This is not unexpected since the thicker samples provide a greater amount of fuel in the test.

EXAMPLE 7

A product was made using 69 lb kraft linerboard impregnated with either 22% or 27% of a solution made up of 32% PAPI 2027, 63% Antiblaze 100, and 5% Santicizer 141. The products made with 22% addition contained 1.56% phosphorous and 5.06% chlorine, and 7.04% PMDI prior to curing. Those with 2,7% addition contained 1.92% phosphorous, 6.21% chlorine, and 8.64% PMDI prior to curing. The Santicizer is normally recommended for use as a general purpose plasticizer for most thermoplastic polymers. In the present case, in addition to its contribution of phosphorous it also serves to reduce the viscosity of the impregnating solution to allow better penetration into the sheet. The resulting products were tested as single ply sheets and as three ply assemblies by the NFPA 701 Large Scale test. Briefly stated, 5 specimens of material 5 in by 7 ft are cut with their long dimension parallel to the machine direction (of the linerboard) and 5 similarly sized specimens are cut in the cross machine direction. The specimens are conditioned at 140°–145° F. (60°–63° C.) for not less than one hour and not more than 1½ hours. Specimens were removed from the oven one at a time and tested immediately. Criteria are that no specimen shall continue flaming for more than two seconds after ignition source removal. Length of char may not exceed 17 inches and no flaming particles on the floor of the apparatus is permitted. The individual sheets of the three ply products were bonded by a poly (vinylacetate) based adhesive. Single ply sheets at both usages passed the afterflame and flaming drips requirements of the test but marginally failed the char length requirement. However, the multi-ply products passed all requirements.

EXAMPLE 8

A product similar to that described above was made using 27% of an impregnating solution made up of 32% PAPI, 58% Antiblaze 100, and 10% Santicizer 141. The product had 1.89% phosphorous 5.72% chlorine, and had 8.64% PMDI prior to curing. Formal fire tests on the product are not yet complete but subjective burning tests indicate that the single ply product had improved characteristics over the equivalent product of Example 6 and would pass NFPA 701.

EXAMPLE 9

A 44 lb saturating paper was treated with 22% and 27% an impregnating solution identical to that of Example 6. Single layer samples passed NFPA 701 Large Scale tests.

EXAMPLE 10

A 69 lb kraft linerboard was impregnated with 22% of a solution of 80% PAPI 2027 and 20% Santicizer 141. Phosphorous content was 0.38% and PMDI level prior to curing was 21.6%. Samples passed DOT 302 fire tests.

EXAMPLE 11

Bleached 69 lb kraft liner was impregnated with 22% of a solution comprising 63% by weight Antiblaze 195, 5% Santicizer 141, and 32% PAPI 2027. Antiblaze 195 is tris(dichloropropyl) phosphate and contains 7.2% phosphorous and 49.1% chlorine. The impregnated product contained 1.09% phosphorous, 6.81% chlorine, and had 7.04% PMDI. After curing and conditioning, the product readily passed the DOT 302 fire test.

The inventors have herein disclosed the best mode of operation of their invention as to the time of filing the application. However, it will be readily apparent to those skilled in the art that many variations can be made which are not disclosed herein. These variations should be considered within the scope of the invention insofar as they are included within the encompass of the following claims.

We claim:

1. A fire retardant cellulose-polymer composite product which comprises cellulosic fibers impregnated with 10–80 parts by weight per 100 parts of cellulose fibers of a treating solution comprising a polyisocyanate at least difunctional in —NCO and a fire retardant material compatible with the isocyanate in a ratio of 4:1 to 1:5, said treating solution being used in a sufficient amount to supply at least 5 parts of the isocyanate per 100 parts of cellulose fibers.

2. The fire retardant cellulose-polymer composite product of claim 1 in which the fire retardant material is an organophosphorous ester.

3. The fire retardant cellulose-polymer composite product of claim 1 in which the fire retardant material is selected from the group consisting of diphosphate esters, monophosphate esters, and mixtures thereof.

4. The fire retardant cellulose-polymer composite product of claim 2 in which the organophosphorous ester contains at least about 7% phosphorous by weight and is present in an amount sufficient to contribute about 0.5–2.5% phosphorous by weight of the product.

5. The fire retardant cellulose-polymer composite product of claim 2 in which the organophosphorous ester contains at least about 7% phosphorous by weight and is present in an amount sufficient to contribute about 1.4–2.2% phosphorous by weight of the product.

6. The fire retardant cellulose-polymer composite product of claim 2 in which the organophosphorous ester is halogenated, the halogen being selected from the group consisting of chlorine, bromine, and mixtures thereof.

7. The fire retardant cellulose-polymer composite product of claim 6 in which the organophosphorous compound contains at least 30% of the halogen by weight.

8. The fire retardant cellulose-polymer composite product of claim 7 in which the halogen is chlorine.

9. The fire retardant cellulose-polymer composite product of claim 2 in which the organophosphorous compound contains at least about 7% phosphorous and 30% of the halogen by weight, the halogen being selected from the group consisting of chlorine, bromine, and mixtures thereof.

10. The fire retardant cellulose-polymer composite product of claim 2 in which the organophosphorous compound is a diphosphate ester having the formula

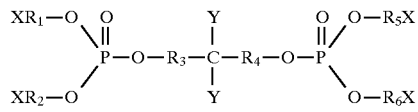

where any of $R_1$ to $R_6$ are $C_1$ to $C_4$ alkyl groups or aryl moieties and X is H, Cl or Br and Y is H, $R_7X$ or $R_8X$ where $R_7$ and $R_8$ are lower alkyl or aryl groups.

11. The fire retardant cellulose-polymer composite product of claim 7 in which the organophosphorous compound is a diphosphate ester having the formula

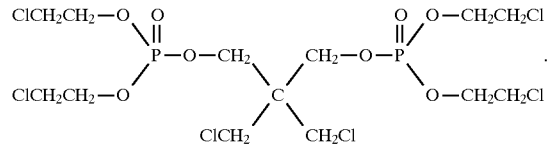

12. The fire retardant cellulose-polymer composite product of claim 2 in which the organophosphorous compound is a phosphate ester having the formula

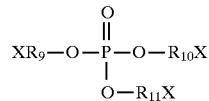

where $R_9$, $R_{10}$, and $R_{11}$ are $C_1$ to $C_{12}$ alkyl groups or aryl moieties and X is H, Cl or Br.

13. The composite cellulose product of claim 12 in which the organophosphate compound is present in an amount of about 2–25% by weight of the treating solution.

14. The composite cellulose product of claim 2 in which the ratio of phosphorous compound to isocyanate in the treating composition is within the range of 1:3 to 3:1 parts by weight.

15. The composite cellulose product of claim 1 in which the cellulose fibers are impregnated with 10–40% of the treating composition.

16. The fire retardant cellulose-polymer composite product of claim 1 in which the polyisocyanate is cured to an insoluble polyurea polymer.

17. The composite cellulose product of claim 1 in which the cellulosic fibers are selected from the group consisting of chemically pulped wood fibers, thermomechanical wood pulps, mechanically defibered wood pulps, and mixtures thereof.

18. The composite cellulose product of claim 17 in which the cellulosic fibers are kraft process wood pulp.

19. The composite cellulose product of claim 1 in which the cellulosic fibers are in sheeted form.

20. The composite cellulose product of claim 1 in which the isocyanate is poly(diphenylmethane diisocyanate).

* * * * *

UNITED STATES PATENT AND TRADEMARK OFFICE
CERTIFICATE OF CORRECTION

PATENT NO : 5,880,243
DATED : March 9, 1999
INVENTOR(S): David W. Park, Bruce A. Thompson It is certified that error appears in the above-identified patent and that said Letters Patent is hereby corrected as shown below:

Column 2, line 13, "oligomriers" should read - -oligomers- -.

Column 2, line 53, "urethianes" should read - -urethanes- -.

Column 3, line 42 "dilsocyanate" should read - -diisocyanate - -.

Column 3, line 48, "ithermomechanical" should read - -thermomechanical- -.

Column 5, line 1, "bum" should read - -burn- -.

Column 8, line 58, "2.7% should read - -27%- -.

Signed and Sealed this

Second Day of May, 2000

Q. TODD DICKINSON

*Attest:*

*Attesting Officer*     *Director of Patents and Trademarks*